United States Patent [19]

Thary et al.

[11] 4,033,623
[45] July 5, 1977

[54] CHILD'S SAFETY RESTRAINT FOR USE IN A VEHICLE

[75] Inventors: Christian Thary, Lure; Armand R. Bernard, Etampes; Jean Francois Labadie, Etampes; Olivier P. De La Taille, Etampes, all of France

[73] Assignee: Etablissements Bertrand Faure, Le Chesnay, France

[22] Filed: June 10, 1975

[21] Appl. No.: 585,598

[30] Foreign Application Priority Data

June 14, 1974  France .............................. 74.20792

[52] U.S. Cl. ................................ 297/390; 297/384; 280/751
[51] Int. Cl.² ........................................ B60R 21/02
[58] Field of Search .......... 297/384, 385, 386, 390, 297/391, DIG. 1, DIG. 2, 216; 280/150 B, 150 SB

[56] References Cited

UNITED STATES PATENTS

| | | |
|---|---|---|
| 3,232,665 | 2/1966 | Von Wimmersperg ............ 297/390 |
| 3,424,497 | 1/1969 | Brilmyer et al. ..................... 297/390 |
| 3,563,600 | 2/1971 | Converse ......................... 297/390 X |
| 3,647,260 | 3/1972 | Grant et al. ......................... 297/219 |
| 3,706,472 | 12/1972 | Mertens .......................... 297/391 X |
| 3,713,695 | 1/1973 | Von Wimmersperg ............ 297/384 |
| 3,784,224 | 1/1974 | Peeler ............................. 297/390 X |
| 3,819,230 | 6/1974 | Bloom ............................ 297/390 X |
| 3,865,433 | 2/1975 | Stafford ............................. 297/390 |

Primary Examiner—Roy D. Frazier
Assistant Examiner—William E. Lyddane
Attorney, Agent, or Firm—Oblon, Fisher, Spivak, McClelland & Maier

[57] ABSTRACT

A child's safety restraint for use in a motor vehicle includes a retaining member adapted to be held in front of a child on one of the vehicle seats and which is shaped such that in the event of a sudden deceleration of the vehicle, the chest and head of the child will come to rest against a rearmost face of the retaining member. The member has an opening defined within a lower portion thereof through which the child's legs can pass, and has a rigid part on a front face thereof and a resilient squab on the rear face thereof. The rigid part has a progressively reduced thickness as one proceeds in the vertically upward direction, while the resilient part has an increased thickness as one proceeds in the same direction. In this manner, the uppermost portion of the retaining member has an increased squab thickness portion for paticularly protecting the head portion of the child under deceleration conditions.

5 Claims, 3 Drawing Figures

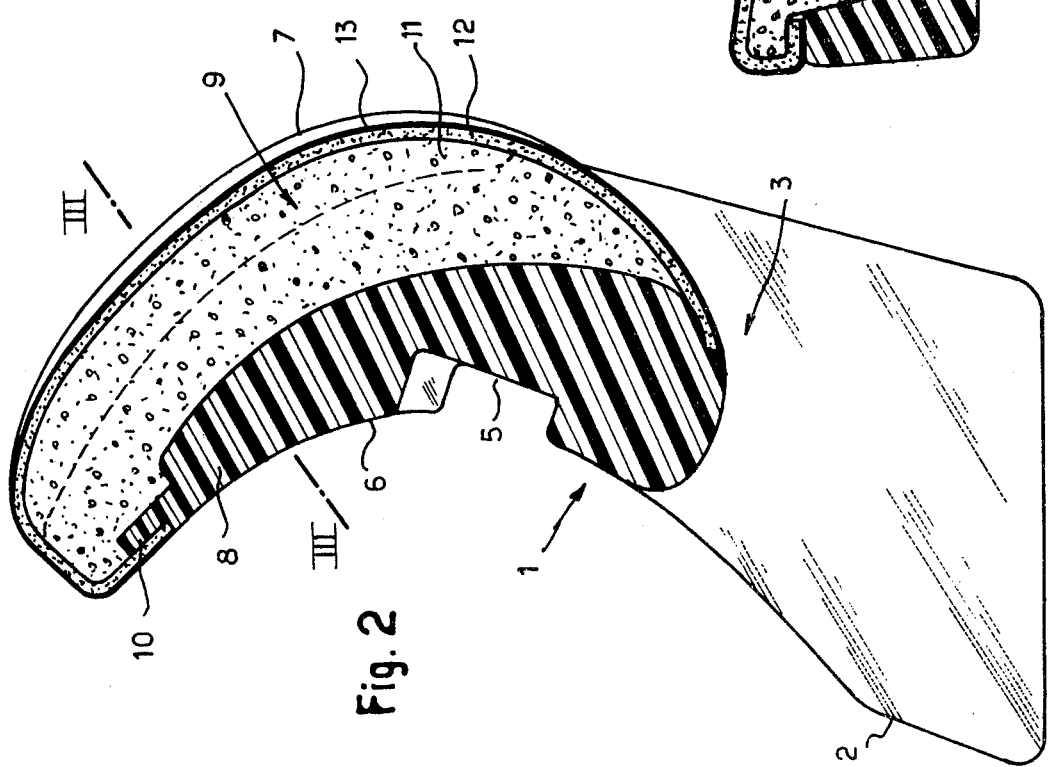

CHILD'S SAFETY RESTRAINT FOR USE IN A VEHICLE

The present invention relates to a child's safety restraint for use in a motor vehicle comprising a retaining member adapted to be held in front of the child on one of the vehicle seats.

Retaining members used in known safety chairs of this type, though limiting the forward movement of the child in the event of sudden deceleration of the vehicle, suffer from the disadvantage of not providing effective protection for the head of the child.

The present invention provides a child's safety restraint for use in a motor vehicle comprising a retaining member adapted to be held in front of a chiild on one of the vehicle seats and so shaped that in the event of sudden declaration of the vehicle, the chest and head of the child will come to rest against a rear most face of said member, wherein said member has at a lower part an opening through which the legs of the child can pass, and has a rigid part on a front face thereof and a squab on the rearmost face, the rigid part of the retaining member is of reduced thickness at its uppermost end, and the squab is of increased thickness above and forwardly of said uppermost end.

With this restraint, the impact to which the child's head is subjected when it strikes the upper end of the retaining member is satisfactorily absorbed since the squab, which is thicker in this zone, is able to take up a great amount of energy.

Furthermore, since the rigid part facing the thickened zone of the squab is of reduced thickness it is able to become detached from the remainder of the retaining member if the impact exceeds a fixed limit, and consequently it is in turn able to absorb a considerable amount of energy.

If follows that the risk of the child sustaining a wound when its head strikes the retaining member is very much reduced.

Preferably, the squab is made of a foamed "memory" plastics material having an outer facing of a supple foamed plastics material enclosed in a cover.

A foamed memory plastics material is one having the ability to deform under the effect of an impact and then progressively to resume its initial shape after a certain delay. Consequently, an object striking a plastics material of this type does not rebound immediately, its kinetic energy being almost totally absorbed.

Thus, when a foamed memory plastics material is used, the impact of the child's head against the retaining member is absorbed in the more efficient manner.

Advantageously, the rearmost faces of the rigid part and the squab have upwardly over their entire height a progressively reduced curvature.

Thus, when the vehicle suddenly decelerates, the chest and head of the child move progressively and therefore less violently into contact with the retaining member.

A preferred embodiment of the present invention will not be more particularly described with reference to the accompanying drawings in which:

FIG. 2 is a vertical cross section, on a larger scale, of the safety restraint illustrated in FIG. 1; and FIG. 3 is a section on line III—III of FIG. 2.

Figure 1:
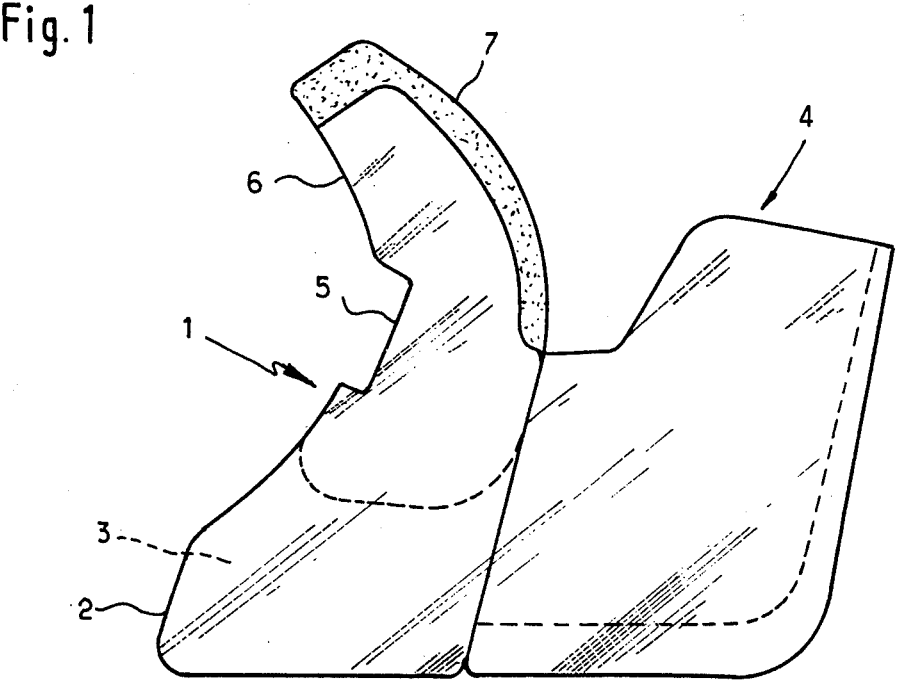
FIG. 1 is a side view of a child's seat provided with a safety restraint in accordance with the invention.

The child's safety restraint shown consists mainly of a retaining member 1 comprising two lateral uprights 2 which at the top define an opening 3 through which the legs of a child can pass.

In the example shown in FIG. 1, the retaining member 1 is secured by means, not shown, to the front of a child's seat 4 which, after the child has been placed thereon, is adapted to be attached to one of the seats of a vehicle by means of a safety belt, not illustrated, which passes through a recess 5 formed in a front face 6 of the safety restraint.

However, it will be appreciated that the retaining member 1 could be used along provided that the lower portion of each of its lateral uprights 2 is extended beyond beyond the rearmost face 7 of the member for contact with the back-rest of the vehicle seat and to form with this back-rest a recess adapted to receive a child who could then be placed directly on the vehicle seat.

Also, the retaining member 1 is of sufficient height to enable its rear face 7 to restrain the chest and head of a child in the event of a sudden deceleration of the vehicle.

Referring particularly to FIG. 2, it will also be seen that the uprights 2 are joined at the top of the opening 3 and that the retaining member 1 includes a rigid part 8 on its front face 6 and a cushioning squab 9 on its rear face 7.

The part 8 has at its uppermost end a zone 10 of reduced thickness above and forwardly of which the squab 9 is of greater thickness. As apparent from FIG. 2, the rigid part 8 has a thickness approximately equal to two-thirds the thickness of the retaining member 1 within the lower, torso-engaging region thereof and approximately equal to one-third of the thickness of the retaining member within the upper head engaging region thereof, and the squab 9 is of increased thickness from the lowermost portion thereof to the upper most end thereof disposed above and forwardly of the uppermost end of the rigid part, the squab having a thickness approximately equal to one-third of the thickness of the retaining member within the lower region thereof and approximately equal to two-thirds the thickness of the retaining member within the upper region thereof.

Thus when a child's head strikes the upper end of the retaining member 1, the impact will be absorbed, on the one hand, by the squab which is thicker at this zone, and on the other hand, by the rigid part 8 of which the zone 10 of reduced thickness will break if the impact exceeds a predetermined limit.

In the embodiment here described, the squab 9 is formed of a foamed memory plastics material 11 having an outer facing of supple foamed plastics material 12 enclosed in a cover 13. The periphery of the cover 13 is secured in any suitable manner to the rigid part 8 as illustrated in FIGS. 2 and 3.

The nature of the materials selected for making the squab 9 clearly enables the squab to absorb, in the best manner, the kinetic energy of a child's body when thrown forward, thus to ensure that the child is fully protected.

Finally, the rigid part 8 and the squab 9 have, over their entire height, a progressively reduced curvature so that in case of accident, the chest and head of the child move progressively and therefore less violently into contact with the squab 9.

It will therefore be seen that the safety restraint of the invention, by ensuring that the impact of a child's head against the retaining member is absorbed in a satisfactory manner, enables the seriousness of any injuries that said member could inflict upon the child, to be reduced.

What we claim is:

1. A child's safety restraint for use in a motor vehicle comprising:
   a retaining member adapted to be held in front of a child on one of the vehicle seats and so shaped that in the event of a sudden deceleration of the vehicle, the chest and head of the child will come to rest against a rearmost face of said member,
   wherein said member includes a lower part within which there is defined an opening through which the legs of the child can pass, and an upper part which includes a rigid part on the front face thereof and a squab on the rearmost face thereof,
   the upper part of said member having a predetermined thickness profile throughout its height while the rigid part of the retaining member is of progressively reduced thickness from the lowermost portion thereof of the uppermost end thereof, said rigid part having a thickness approximately equal to two-thirds the thickness of said retaining member within the lower, torso-engaging region thereof and approximately equal to one-third of the thickness of said retaining member within the upper head engaging region thereof, and the squab is of increased thickness from the lowermost portion thereof to the uppermost end thereof disposed above and forwardly of said rigid part uppermost end, said squab having a thickness approximately equal to one-third of the thickness of said member within the lower region thereof and approximately equal to two-thirds the thickness of said member within the upper region thereof, said rigid and squab portions of said member therefore having reversely complementary thickened portions so as to define said upper part of said member of said predetermined thickness profile.

2. A safety restraint as claimed in claim 1 in which the squab is formed of a foamed memory plastics material which has an exterior facing of supple foamed plastics material enclosed in a cover.

3. A safety restraint as claimed in claim 1 in which the rearmost faces of the rigid part and the squab have, upwardly over their entire height, a progressively reduced curvature.

4. A safety restraint as set forth in claim 1, further comprising:
   a seat member operatively connected to said retaining member at a position rearwardly thereof.

5. A safety restraint as set forth in claim 1, further comprising:
   frangible means integrally connected to said rigid part of said retaining member at the uppermost part thereof and adapted to break if the impact of the child's head exceeds a predetermined limit, whereby damage to the child's head is prevented.

* * * * *